UNITED STATES PATENT OFFICE.

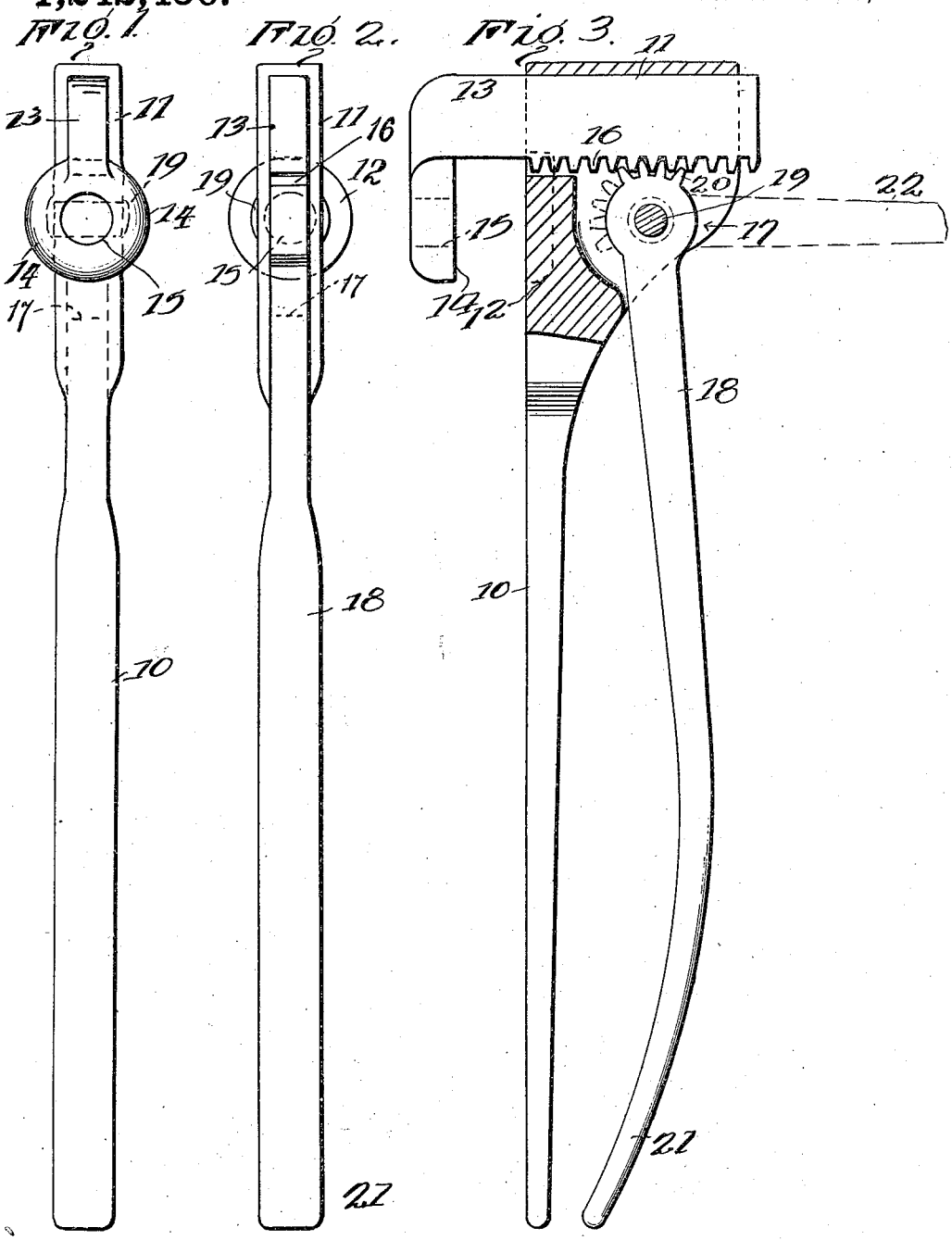

THOMAS P. GREENHAW, OF HOBART, OKLAHOMA.

NUTCRACKER.

1,242,436.  Specification of Letters Patent.  Patented Oct. 9, 1917.

Application filed August 15, 1916. Serial No. 115,037.

*To all whom it may concern:*

Be it known that I, THOMAS P. GREENHAW, a citizen of the United States, residing at Hobart, in the county of Kiowa and State of Oklahoma, have invented certain new and useful Improvements in Nutcrackers, of which the following is a specification.

This invention relates to improvements in implements for cracking nuts and for like purposes, and has for one of its objects to provide a simply constructed device which may be adjusted to receive and crack nuts of various sizes and shapes without structural change in the parts.

With these and other objects in view the invention consists in certain novel features of construction as hereinafter shown and described, and then specifically pointed out in the claim; and in the drawings illustrative of the preferred embodiment of the invention—

Figure 1 is an elevation from the nut-receiving side;

Fig. 2 is an elevation from the side opposite to that shown in Fig. 1;

Fig. 3 is a side elevation partly in section.

The improved implement comprises a stock 10 having a transverse guideway, indicated at 11, in one end and lateral enlargements 12 which constitute a stationary jaw. Mounted for movement through the guideway is a bar or arm 13 having a laterally enlarged opposing jaw 14. The enlargements 12—14 correspond in form and size and are adapted to engage face to face when the member 13 is disposed in its extreme inward position. The jaw portion 14 is preferably provided with a relatively large opening 15 therethrough which is designed to receive the outer end of the nut to be cracked and thus assists in retaining it in position during the cracking or crushing action. The member 13 is provided with a gear rack, indicated at 16. Extending from the guideway 11 and communicating therewith is a socket or cavity 17 in which a lever arm 18 is pivoted at 19. The member 18 is provided with a gear segment 20 which engages with the rack 16, as shown in Fig. 3. At its free end, the lever 18 is curved toward the stock 10, as shown at 21 in Fig. 3. By this arrangement, when the lever 18—21 is in its closed position, a considerable space is left to receive the fingers of the operator and prevent the fingers from being pinched.

It will be noted that the teeth 20 of the segment are limited in number so that, when the lever arm is moved into its outer position, as indicated in dotted lines at 22 in Fig. 3, the teeth 20 will be entirely disconnected from the teeth 16 to release the member 13 and the jaw 14 so that the member and the jaw may be adjusted to correspond to the nut which is to be crushed. After the member 13 and its jaw 14 has been adjusted to the proper position, the lever 18 is moved toward the stock 10, which movement causes the teeth 20 to again engage the teeth 16 and thus forcibly move the member 13 in its guideway 11 and exert a powerful crushing action upon the nut held between the jaws 12—14. By this simple means, the device may be adjusted to nuts of various sizes and exert a powerful crushing action by simply manipulating the lever. The improved device is simple in construction, can be inexpensively manufactured, and may be made of any suitable size and material.

Having thus described the invention, what is claimed as new is:

A nut cracker comprising a stock provided near one end with lateral enlargements forming an abutment and having a transverse guideway at its end adjacent and beyond the abutment, the said abutment constituting a stationary jaw and the stock being formed with a recess in rear of the jaw, a slide mounted in said guideway and having an end turned to one side parallel with the face of the abutment to form an overhanging opposing movable jaw arranged to coöperate with the abutment, said movable jaw having a nut-receiving opening, and an operating lever mounted in the recess in the stock in rear of the abutment and adjacent the guideway and arranged to engage and actuate the slide.

In testimony whereof I affix my signature.

THOMAS P. GREENHAW. [L. S.]